United States Patent
Hiwaki et al.

(10) Patent No.: US 6,952,064 B2
(45) Date of Patent: Oct. 4, 2005

(54) MOTOR

(75) Inventors: Hideharu Hiwaki, Kadoma (JP);
Yoshinari Asano, Kusatsu (JP);
Hisakazu Kataoka, Takefu (JP); Sunao Hashimoto, Moriguchi (JP); Shinichi Okuyama, Takefu (JP); Hiroshi Murakami, Suita (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/483,658

(22) PCT Filed: Jul. 11, 2002

(86) PCT No.: PCT/JP02/07042

§ 371 (c)(1),
(2), (4) Date: Feb. 20, 2004

(87) PCT Pub. No.: WO03/007457

PCT Pub. Date: Jan. 23, 2003

(65) Prior Publication Data

US 2004/0195926 A1 Oct. 7, 2004

(30) Foreign Application Priority Data

Jul. 11, 2001 (JP) ..................................... 2001-210071

(51) Int. Cl.$^7$ .............................................. H02K 3/48
(52) U.S. Cl. ......................... 310/214; 310/51; 310/216
(58) Field of Search ........................... 310/214, 43, 45, 310/51, 215, 216

(56) References Cited

U.S. PATENT DOCUMENTS

| 4,642,502 A | * | 2/1987 | Carpenter et al. | .......... 310/156 |
| 4,995,159 A | * | 2/1991 | Hancock et al. | .............. 29/596 |
| 5,498,916 A | * | 3/1996 | Lindner et al. | ............. 310/214 |

FOREIGN PATENT DOCUMENTS

| JP | 1-157572 | 10/1989 |
| JP | 5-50961 | 7/1993 |
| JP | 8-33254 | 2/1996 |
| JP | 08280163 A | 10/1998 |
| JP | 10-285845 | 10/1998 |
| JP | 10-313556 | 11/1998 |
| JP | 2000-134853 | 5/2000 |
| JP | 2000-175380 | 6/2000 |
| JP | 2000-184631 | 6/2000 |
| JP | 2000-278895 | 10/2000 |
| JP | 2000-287397 | 10/2000 |
| JP | 2001218392 A | 8/2001 |
| JP | 2002-112473 | 4/2002 |
| JP | 2002-112488 | 4/2002 |
| JP | 2002-171726 | 6/2002 |

* cited by examiner

Primary Examiner—Dang Le
(74) Attorney, Agent, or Firm—Steptoe & Johnson LLP

(57) ABSTRACT

It is intended to suppress the vibration and noise during operation of a concentrated winding electric motor and to provide an electric motor with high efficiency, low vibration and low noise. A skew is formed on at least one of a stator (10) and a rotor (20), arranged with a concentrated winding, and a winding vibration damping body (18) is inserted between windings (13) of different phases within a winding groove (19) and contacted therewith.

24 Claims, 12 Drawing Sheets

F I G. 2
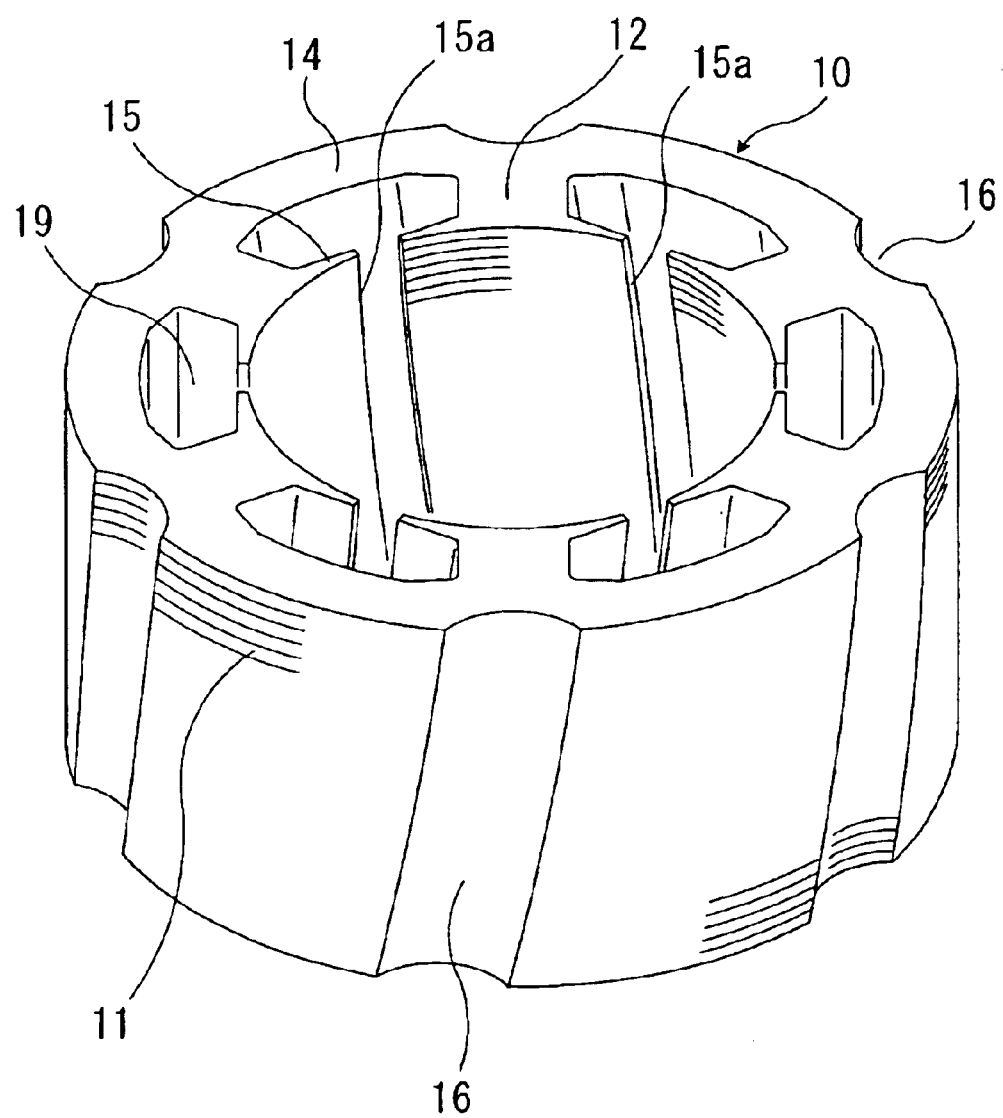

F I G. 4
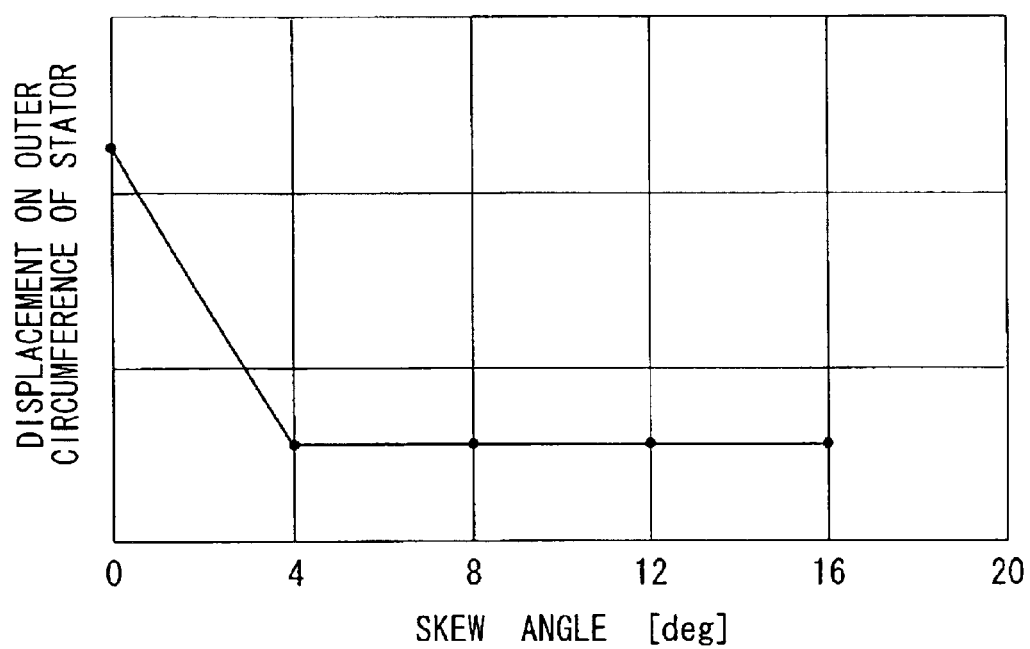

F I G. 5
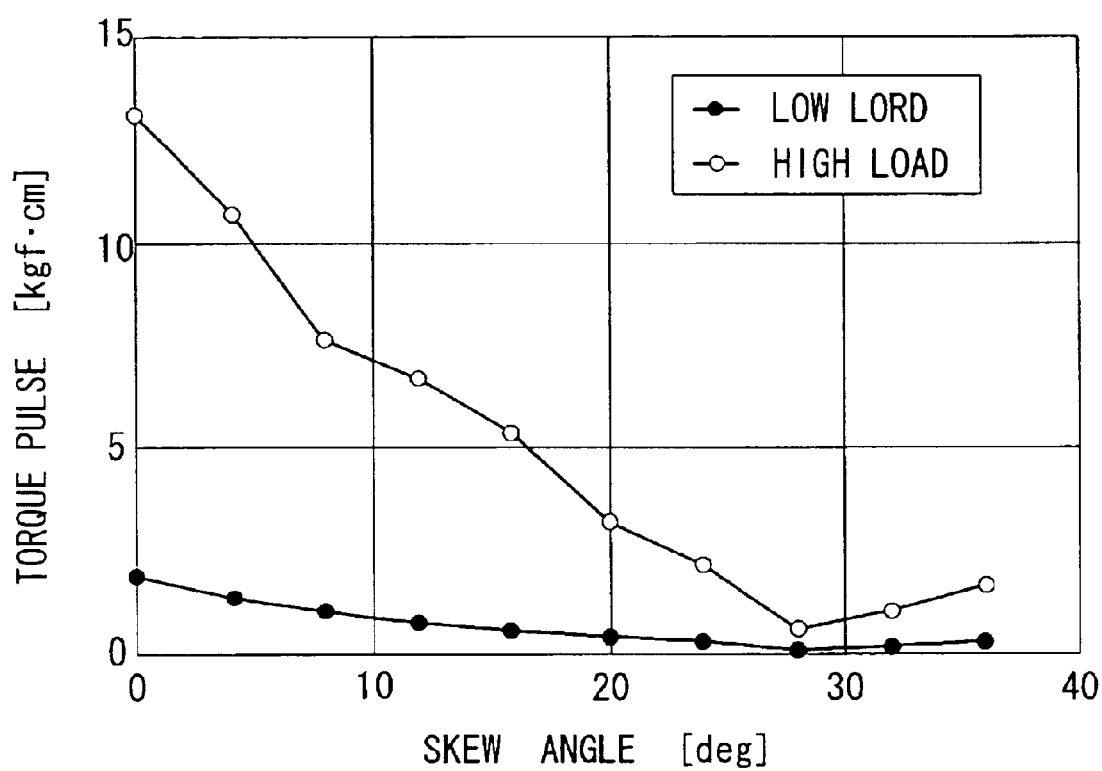

MOTOR

TECHNICAL FIELD

The present invention relates to a concentrated winding motor having low noise and low vibration and a hermetically enclosed compressor and the like using the motor.

BACKGROUND ART

Conventionally concentrated winding motor used for compressors and the like of air conditioners and refrigerators are configured as shown in FIGS. 10 to 12.

The concentrated winding motor is composed of a stator 60 and a rotor 80 which is rotatively supported in the stator 60. The stator 60 shown in FIGS. 10 and 12 is constituted of laminated stator cores 61. The stator core 61 is formed of teeth 62 provided with windings and a substantially annular yoke 64 for connecting the outer circumferences of the teeth 62. Tooth tip protrusions 65, which protrude in the circumferential direction along the inside diameter of the stator core, are formed on the tips of the teeth 62.

In FIG. 10, the windings provided on the six teeth 62 on the stator core 61 are represented by three-phase windings 63U, 63V, and 63W. The dimensions and shapes of the three-phase windings 63U, 63V, and 63W are not correctly indicated. Correct dimensions and shapes are shown in FIG. 11 where winding is performed.

FIG. 11 is a sectional view taken along line X–X' of FIG. 10. Windings 63 representing the three-phase windings 63U, 63V, and 63W are provided on the teeth 62 of the stator core via an insulating material 67 composed of an insulator which is formed into a film or is resin molded.

The three-phase windings 63U, 63V, and 63W are star connected with one another and have 120° rectangular wave conduction in which two of three phases are energized and driven at the same time. Further, an applied voltage is changed by PWM control.

Moreover, the stator cores 61 of this shape are laminated straight in the axial direction without forming a skew thereon. Notches 66 formed on the outer circumference of the stator core 61 act as through-holes between a shell 90 and the stator core 61 in the state in which the stator 60 is shrinkage-fitted to the shell 90 of a compressor. The notches 66 also act as passages for a refrigerant.

In the stator 60, the rotor 80 is rotatively held concentrically with respect to the stator 60. The rotor 80 has permanent magnets 82 embedded in a rotor core 81. End plates (not shown) are attached to both ends of the rotor core 81 and a rivet is passed through a through-hole provided in the rotor core, so that the end plates on both ends are fixed. Moreover, a shaft is provided in a shaft hole 83.

Therefore, due to a rotating magnetic field generated by current applied to the three-phase windings 63U, 63V, and 63W which are provided on the stator 60, the rotor 80 is rotated about the shaft by torque which is a combination of magnet torque and reluctance torque.

As described above, in the case of the stator 60 in which a lamination is made straight without forming a skew, attracting or repelling stresses increase between the adjacent tooth tip protrusions 65, thereby increasing vibrations as compared with distributed winding. Such vibrations are considerably affected by a vibration in the radius direction as well as a vibration in a rotating direction.

Particularly in PWM control and 120° rectangular wave conduction in which only two of three phases are energized, vibrations are considerably increased. This is because current flowing into windings contains more harmonics as compared with sine wave driving. Further, in 120° rectangular wave conduction, a rapid change in current generates strong exciting force on the tooth tip protrusions, thereby increasing vibrations.

It is conventionally known that the formation of a skew is effective as a method for reducing variations in torque to have fewer vibrations. A skew is not formed only on the stator. For example, Japanese Patent Laid-Open No. 2000-175380 discloses that a skew is formed on a rotor or on both of a stator and the rotor. Vibrations generated in the concentrated winding motor of FIG. 10 can be reduced by forming a skew.

However, in the case where variations in torque is reduced by forming a skew on a stator and a stator core has ribs forming teeth on an annular inside diameter forming a yoke, the ribs are tilted by the skew. The occurrence of circular vibrations can be reduced but cannot be completely eliminated only by skewing the stator. Further, it is found that windings stored in a noncontact manner in the same winding groove cause a mass with respect to generated slight circular vibration and thus vibrations are increased.

DISCLOSURE OF INVENTION

An object of the present invention is to suppress vibration and noise during an operation of a concentrated winding motor and to provide a motor having low vibration and low noise with high efficiency.

In order to solve the above-described problem, the motor of the present invention is configured so that a skew is formed on at least one of a stator, which has concentrated windings, and a rotor, a winding vibration damping body is inserted between the windings in the winding groove so as to come into contact with the windings directly or via an insulating material, and the windings in the winding groove are supported by the winding vibration damping body.

Further, when the number of poles is Np, a relative skew angle formed by the stator and the rotor is set at 4° to (120/Np)°.

With this configuration, it is possible to realize a highly efficient motor capable of suppressing vibration and noise during an operation the concentrated winding motor.

A motor according to a first aspect 1 of the present invention comprises a stator which has an annular yoke, a plurality of teeth arranged substantially at regular intervals substantially in the radius direction on the inner circumference of the yoke, a winding groove between the adjacent teeth, and concentrated windings provided on each of the teeth, and a rotor that is opposed to the inner circumference of the stator with a small clearance and is rotatively held, wherein a skew is formed on at least one of the stator and the rotor, and a winding vibration damping body is inserted between the windings in the winding groove.

With this configuration, even when the winding have a low space factor, the winding are supported by the winding vibration damping body in the winding groove, so that the strength of the stator can be improved and the vibration of the windings can be suppressed or damped. In the case where a skew is formed on the rotor as well as the stator, cogging torque and a torque pulse can be reduced even when the stator forms a smaller skew angle.

A motor according to a second aspect of the present invention is the motor of the first aspect, wherein the winding vibration damping body is made of a non-magnetic material or a material with a conductivity σ, where σ<1×$10^{-5} \Omega^{-1} m^{-1}$.

A motor according to a third aspect of the present invention is the motor of the first or second aspects, wherein the winding vibration damping body has a thermal expansion coefficient α, where α>1.1×10$^{-5}$k$^{-1}$. With this configuration, the winding vibration damping body has a higher thermal expansion coefficient than a stator core, so that the teeth can be held more firmly by heat generation during an operation of the motor.

A motor according to a fourth aspect of the present invention is the motor of any one of the first to third aspects, wherein the rotor has permanent magnets embedded in a rotor core. With this configuration, it is possible to effectively use magnet torque caused by the permanent magnets and reluctance torque caused by the saliency of the rotor.

A motor according to a fifth aspect of the present invention is the motor of the fourth aspect, wherein a rotor skew is formed on the rotor core which is integrally formed by rotating rotor core units by a given angle in the circumferential direction, the rotor core units having magnet embedding holes in the axial direction of the rotor and being divided into at least two in the axial direction of the rotor, the permanent magnets being embedded in each of the magnet embedding hole. With this configuration, it is possible to reduce the leakage flux of the permanent magnets.

A motor according to a sixth aspect of the present invention is the motor of the fifth aspect, wherein the rotor core is divided in the axial direction at regular intervals and the rotor core units are each rotated in the circumferential direction at regular intervals. With this configuration, the number of components can be reduced.

A motor according to a seventh aspect of the present invention is the motor of any one of the first to sixth aspects, wherein when the rotor has Np poles, a relative skew angle formed by the stator and the rotor is 4° to (120/Np)°. With this configuration, it is possible to suppress the circular vibration of the stator and rotor core. Further, when a skew is formed on the stator and the rotor, a skew angle formed by the stator and the rotor can be smaller.

A motor according to an eighth aspect of the present invention is the motor of any one of the first to seventh aspects, wherein the winding is composed of a self-welding wire. With this configuration, it is possible to improve the stiffness of the stator including the windings and the stator core.

A motor according to a ninth aspect of the present invention is such that the stator is formed by laminating stamped electromagnetic steel plates, and when a skew angle is θs and the number of the laminated electromagnetic plates is Ns, at least Ns small holes are provided, near the outer circumference of the stamped electromagnetic steel plates, on the same circumference with a pitch of θh=θs÷Ns(°) relative to the center of rotation. With this configuration, the skew angle of the stator core can be readily fixed with accuracy.

A motor according to a tenth aspect of the present invention is the motor of any one of the first to eighth aspects, wherein the stator is formed by laminating stamped electromagnetic steel plates, and when a skew angle is θs, a long hole is provided near the outer circumference of the stamped electromagnetic steel plates, the long hole extending over an angle of θh=θs+α(°) on the same circumference with respect to the center of rotation. With this configuration, the skew angle of the stator core can be readily fixed with accuracy.

A motor according to an eleventh aspect of the present invention is the motor of any one of the first to eighth aspects, wherein a grove or a protrusion is formed on the outer circumference of the stator core and a cylindrical frame is engaged in the stator core to form a skew, the cylindrical frame forming a protrusion or groove twisted by a skew angle in the axial rotating direction on the inner circumference to correspond to the groove or protrusion on the outer circumference of the stator core. With this configuration, the skew angle of the stator can be readily fixed with accuracy.

A hermetically enclosed compressor according to a twelfth aspect of the present invention comprises the motor according to any one of the first to tenth aspects. With this configuration, it is possible to realize a hermetically enclosed compressor with low vibration and low noise.

A hermetically enclosed compressor according to a thirteenth aspect of the present invention is the compressor of the twelfth aspect, wherein the stator of the motor forms notches acting as passages for a refrigerant on the outer circumference of the stator core, the outer circumference corresponding to the teeth. With this configuration, while a magnetic path required for the passage of a magnetic flux is secured, though-holes can be formed between the shell of the compressor and the stator core when the stator is shrinkage-fitted to the shell of the compressor.

A hermetically enclosed compressor according to the fourteenth aspect of the present invention uses the motor of the tenth aspect, and the cylindrical frame also acts as the shell of the hermetically enclosed compressor. With this configuration, it is not necessary to use a special jig for forming a skew on the stator, thereby reducing the number of assembling steps.

A hermetically enclosed compressor according to a fifteenth aspect of the present invention is the compressor of any one of the twelfth to fourteenth aspects, wherein an HFC or a natural refrigerant is used as a refrigerant. With this configuration, an environmental load can be reduced.

A hermetically enclosed compressor according to a sixteenth aspect of the present invention is the compressor of any one of the twelfth to fifteenth aspects, wherein the terminals of the winding of the motor are fed with a voltage of 50 volts or lower. With this configuration, it is possible to realize a hermetically enclosed compressor capable of battery driving with low vibration and low noise.

A refrigeration cycle according to the seventeenth aspect of the present invention uses the hermetically enclosed compressor according to any one of the twelfth to sixteenth aspects. With this configuration, it is possible to realize a refrigeration cycle with low vibration and low noise.

An air conditioner according to an eighteenth aspect of the present invention uses the hermetically enclosed compressor according to any one of the thirteenth to sixteenth aspects. With this configuration, it is possible to realize an air conditioner with low vibration and low noise.

An automobile according to a nineteenth aspect of the present invention is equipped with the air conditioner of the eighteenth aspect. With this configuration, it is possible to realize an automobile with low vibration and low noise.

An automobile according to a twentieth aspect of the present invention is equipped with the motor according to any one of the first to tenth aspects as an actuator, and the terminals of the winging of the motor is fed with a voltage of 50 volts or lower. With this configuration, it is possible to realize an automobile with low vibration and low noise.

A method of fabricating a motor according to a twenty-first aspect of the present invention is such that in fabricating the motor of the ninth aspect, the method includes: laminating the electromagnetic steel plates while displacing each of the small holes formed on the electromagnetic steel, and inserting a pin through the small holes of the laminated electromagnetic steel plates to fix the electromagnetic steel plates, so that the stator is fabricated with a skew.

A method of fabricating a motor according to a twenty-second aspect of the present invention is such that in fabricating the motor of the tenth aspect, the method includes: inserting a pin through the long hole of the stamped electromagnetic steel plates to make a lamination, twisting an upper layer of the stator around the shaft center from a lower layer of the stator to form a skew on the stator, and performing fixation by welding, bonding, or applying a pressure on the outer circumference of the laminated electromagnetic steel plates, so that the stator is fabricated.

A method of fabricating a hermetically enclosed compressor according to a twenty-third aspect of the present invention is such that in fabricating the hermetically enclosed compressor using the motor of the eleventh aspect, a groove or a protrusion is formed on the outer circumference of the stator core and the stator core is engaged to the shell of the hermetically enclosed compressor of the cylindrical frame, the cylindrical frame forming a protrusion or groove twisted by a skew angle in the axial rotating direction on the inner circumference to correspond to the groove or the protrusion on the outer circumference of the stator core, thereby forming a skew.

A method of fabricating a hermetically enclosed compressor according to a twenty-fourth aspect of the present invention is such that in fabricating the hermetically enclosed compressor using the motor of the eleventh aspect, the method includes: forming a groove or a protrusion on the outer circumference of the stator core, engaging the stator core to a jig which is a cylindrical frame being dividable into at least two or more in the circumferential direction and formed with a protrusion or groove twisted by a skew angle in the axial rotating direction on the inner circumference so as to correspond to the groove or the protrusion on the outer circumference of the stator core so that a skew is formed, and detaching the stator having the formed skew from the jig and attaching the stator to the inside of the shell of the hermetically enclosed compressor.

BRIEF DESCRIPTION OF DRAWINGS

FIG. 2 is a perspective view showing a stator according to the embodiment;

FIG. 4 is a characteristic diagram showing a displacement on the outer circumference of the stator core and a skew angle formed by the stator core according to the embodiment;

FIG. 5 is a characteristic diagram showing a torque pulse and a skew angle according to the embodiment;

BEST MODE FOR CARRYING OUT THE INVENTION

Referring to FIGS. 1 to 9, the examples of the present invention will be described below.

Figure 1:
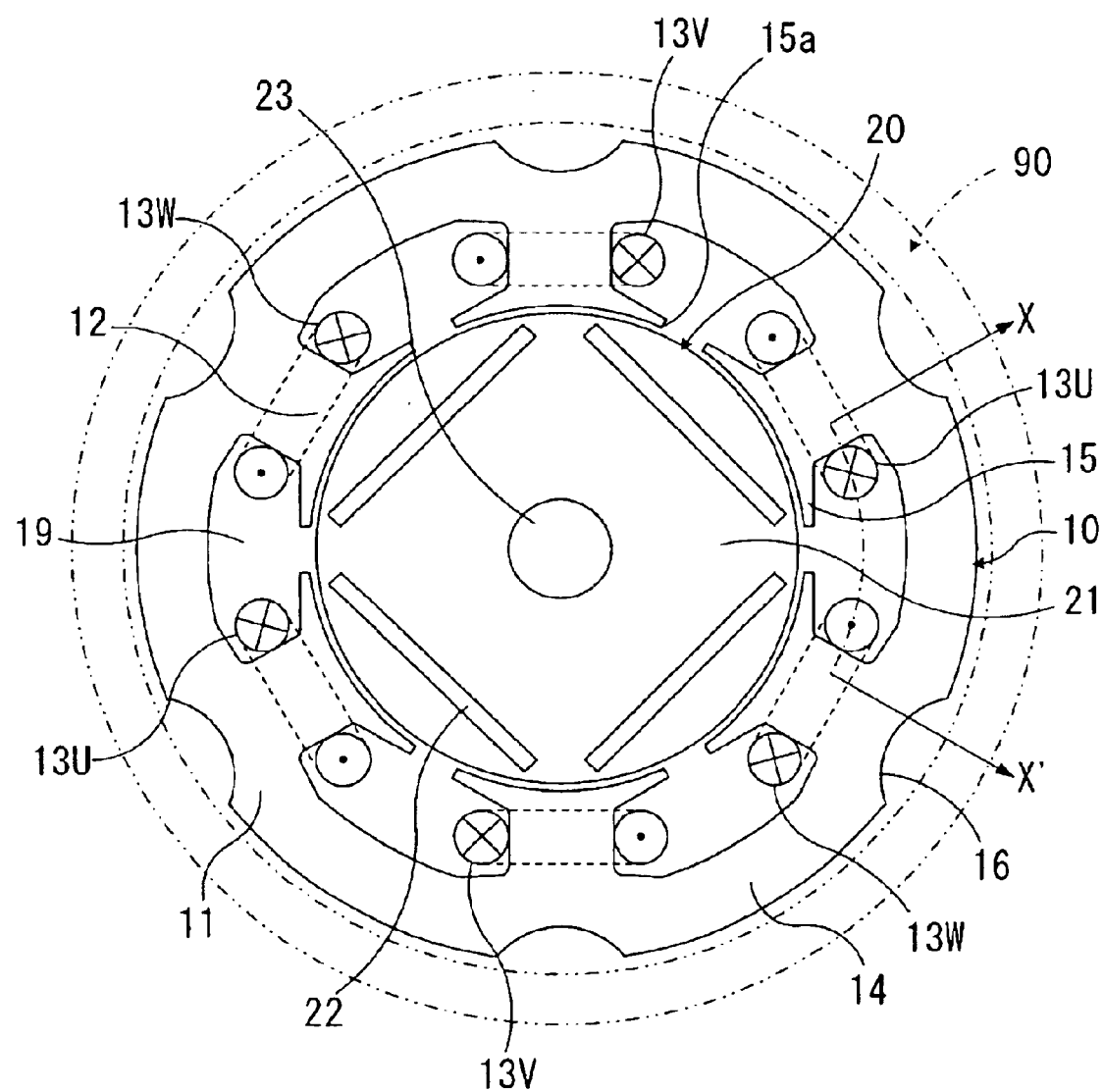
FIG. 1 is a sectional view showing a concentrated winding motor according to an embodiment of the present invention.
Figure 3:
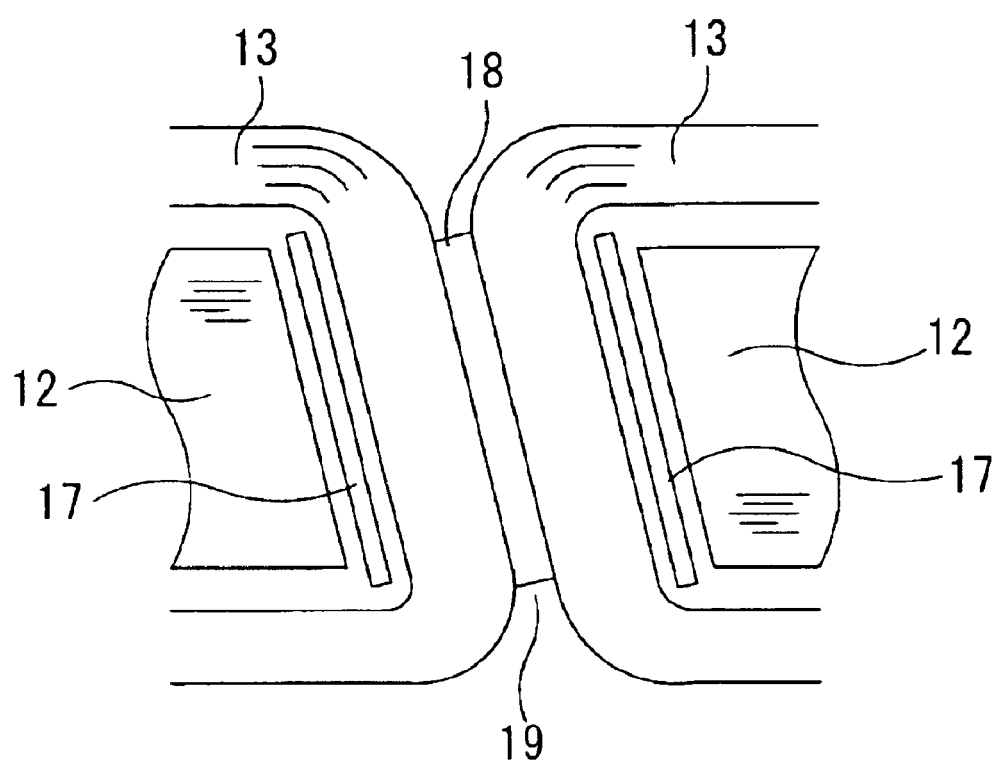
FIG. 3 is a sectional view showing teeth and a winding groove of a stator core according to the embodiment.
Figure 10:
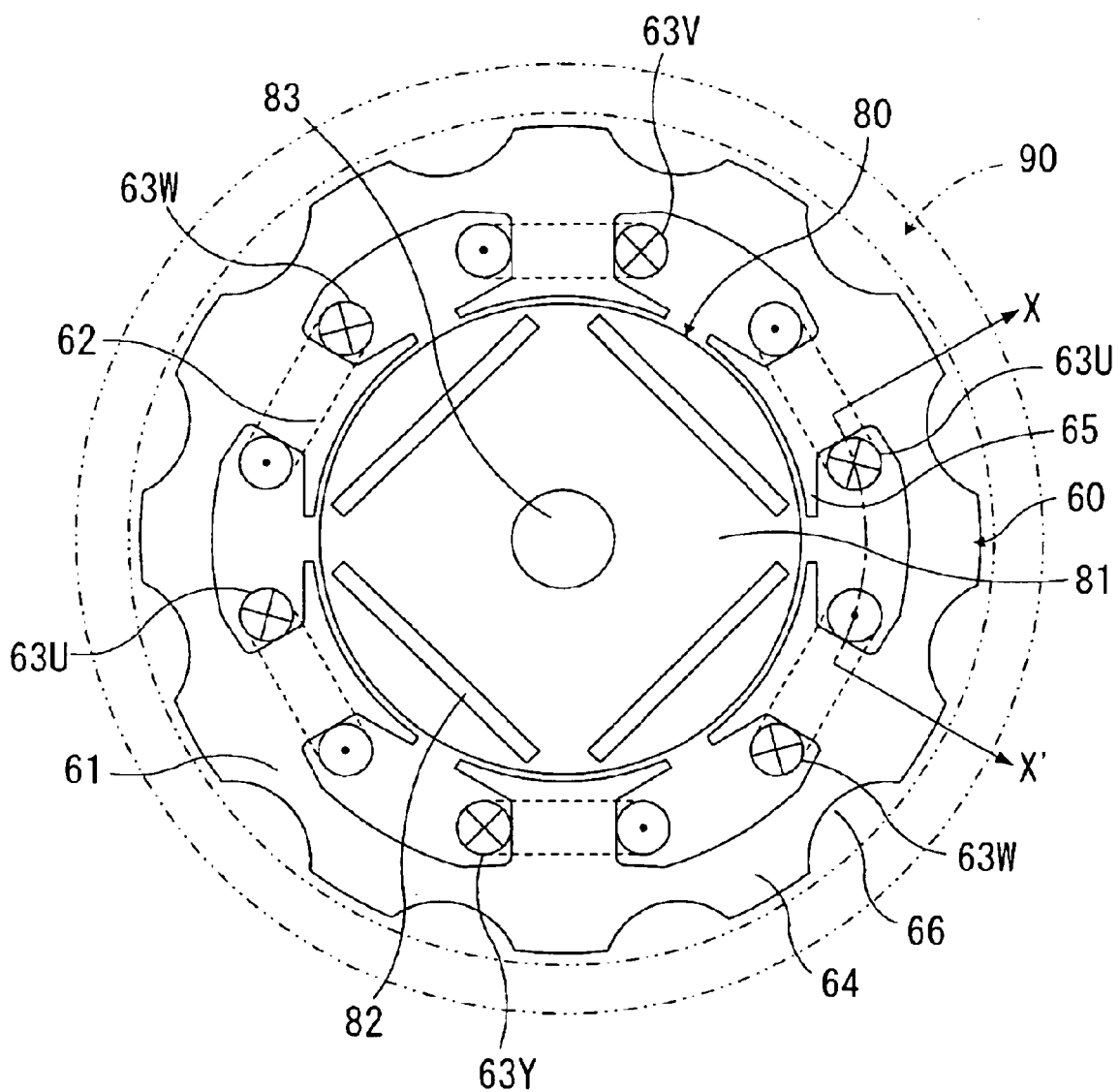
FIG. 10 is a sectional view showing a conventional concentrated winding motor.
Figure 11:
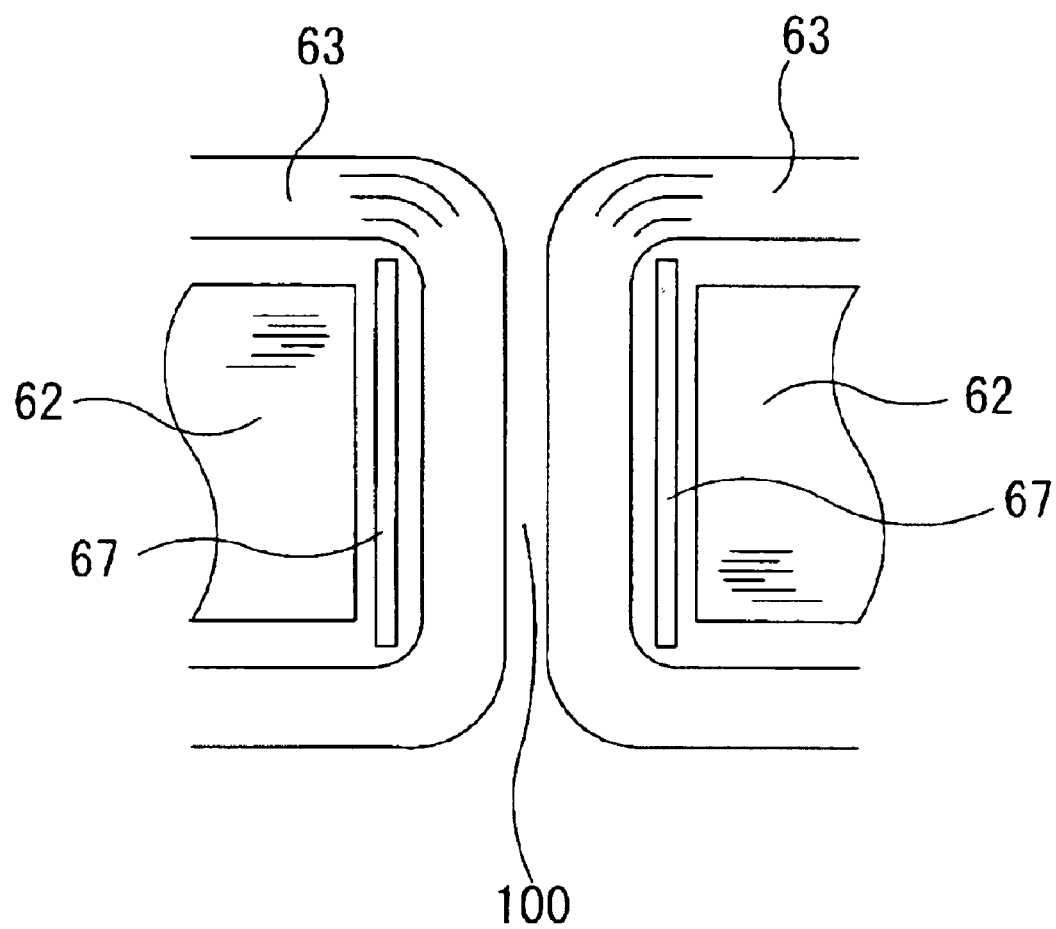
FIG. 11 is a sectional view showing teeth and a winding groove of a stator core in the conventional concentrated winding motor.
Figure 12:
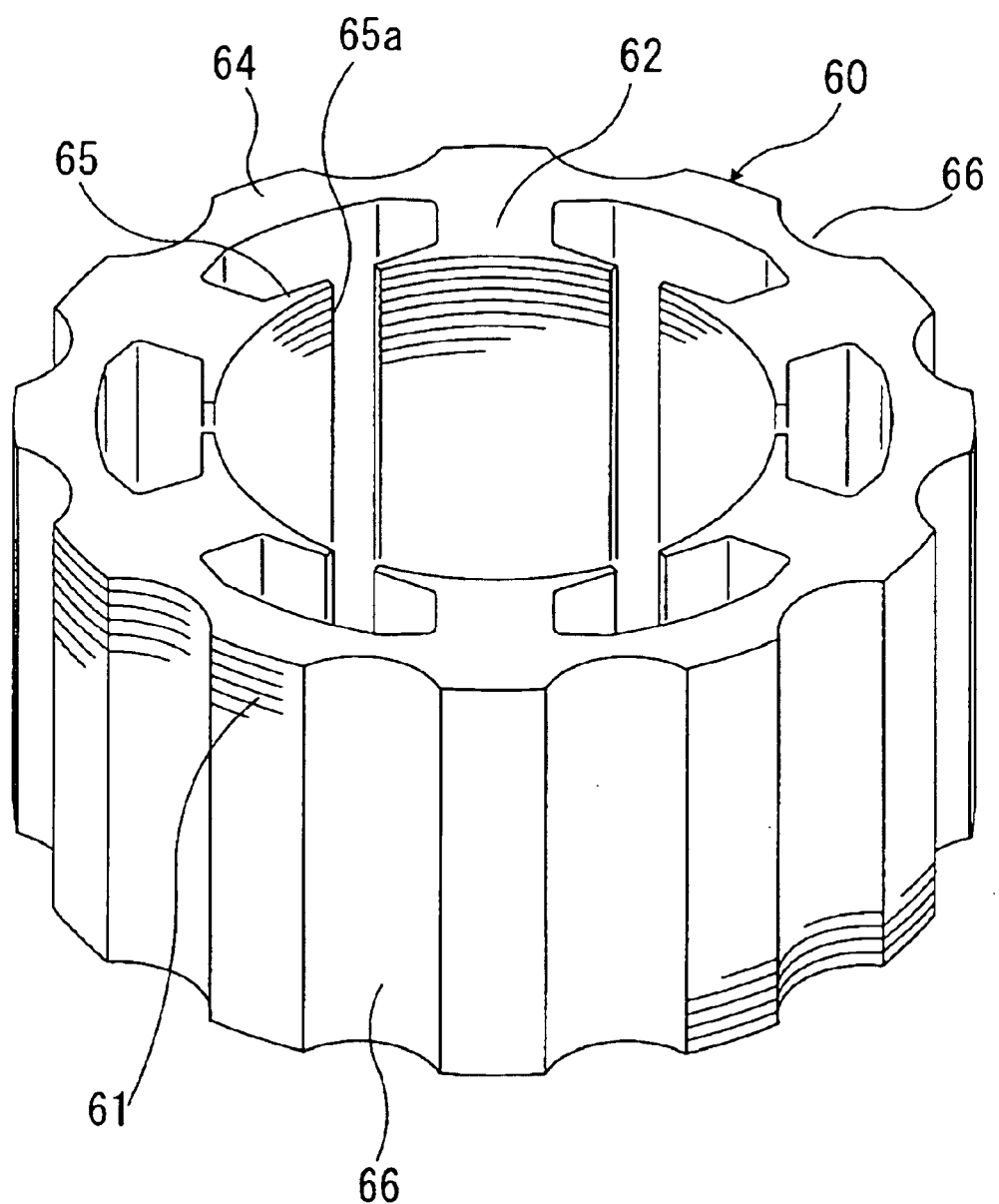
FIG. 12 is a perspective view showing the stator core in the conventional concentrated winding motor.

FIGS. 1 to 3 show a concentrated winding motor according to an example of the present invention. In a conventional concentrated winding motor shown in FIGS. 10 to 12, stator cores 61 are laminated straight in the axial direction without forming a skew and thus ends 65a along the circumferential direction of the tooth tip protrusions 65 are formed along a straight line extending in the axial direction. On the other hand, in the present embodiment, ends 15a along the circumferential direction of a tooth tip protrusion 15 of a stator core 11 are laminated obliquely with respect to the axial direction, so that a skew is formed.

Further, winding on teeth is shown in FIG. 3. Windings 13 of different phases are in contact with each other in a winding groove 19 with a winding vibration damping body 18 interposed between the windings 13. This winding state is different from the conventional state shown in FIG. 11 in which a clearance 100 is provided between the windings 63 of different phases in a winding groove.

Besides, regarding the stator structure, the connecting state of three-phase windings 13U, 13V, and 13W, and the conduction and driving of the three-phase windings 13U to 13W, the present embodiment is similar to the conventional art.

The details will be described below.

A motor of FIG. 1 that is used for a compressor of an air conditioner, a refrigerator, and the like is constituted of a stator 10 and a rotor 20. In the stator 10, the three-phase windings 13U, 13V, and 13W are provided on six teeth 12 formed on the stator core 11. As shown in FIG. 3, an insulating material 17 of a film and an insulator is interposed between the winding 13 and the stator core 11.

Notches 16 are formed on the outer circumference of the stator core 11. The notch 16 acts as a through-hole between a shell 90 and the stator core 11 while the stator core 11 is shrinkage-fitted into the shell 90 of the compressor. The notch 16 also acts as a passage for a refrigerant.

The rotor 20 disposed in a hole formed in the stator core 11 has permanent magnets 22 embedded in a rotor core 21. Permanent magnets 22 are not limited to those of FIG. 1. For example, a plurality of magnets may be disposed (embedded) like reversed arcs at least in one or more layers.

FIG. 2 shows that a skew is formed on the stator 10 which is formed by laminating the planar stator cores 11 of FIG. 1. Components other than the stator cores 11, for example, 13U, 13V, 13W and so forth which form the winding 13 are not shown in FIG. 2.

The winding 13 can be fabricated by any method of nozzle winding, the inserter method, and a winding method of providing windings around the teeth 12 while passing the end of a copper wire (winding) through a winding groove on the top and underside of the stator core two or more times.

When the windings 13 are wound by nozzle winding, the windings can be arranged with an increased space factor and the axial length of a motor can be reduced. On the other hand, when a skew is formed on the stator 10 after winding, tension is applied to the windings 13 by forming the skew. However, the windings 13 are wound loosely beforehand or a space having a length corresponding to the skew is provided on one or both axial end faces of the stator core 11, so that tension can be reduced. Further, when nozzle winding is performed on the laminated stator cores 11, a space for moving a nozzle is necessary in the winding groove 19. When the windings 13, which are wound around the adjacent teeth 12 and are stored in the same winding groove 19, are not sufficiently in contact with each other within the predetermined skew angle, it is preferable to use the winding vibration damping body 18.

Subsequently, when the windings 13 are provided by the inserter method, the width of an opening on the winding groove 19 (the width of a clearance between the adjacent tooth tip protrusions 15) can be smaller as compared with nozzle winding, so that the interlinkage of a magnetic flux can be effectively obtained, a space factor can be improved, and the motor can be more efficient. Moreover, in ordinary cases, the winding 13 is temporarily wound larger than the width of the tooth tip protrusion 15 before insertion and the winding 13 has an inner circumference longer than the outer circumference of the tooth 12 (from the tooth tip protrusion 15 to the outside diameter portion of the stator core 11). Thus, when the winding 13 is provided in the winding groove 19, a space is formed between the axial end of the stator core 11 and the inner circumference on the axial end of the winding 13. Even when a skew is formed on the stator 10 after winding, tension is not applied to the winding 13. Therefore, an advantage is obtained in productivity and reliability.

Finally, in the case of the winding method of passing the end of a copper wire (winding 13) through the end of the winding groove 19 on the top and the undersurface of the stator 11 so as to provide the windings 13 around the teeth 12, since it is not necessary to insert the winding 13 from the opening of the winding groove 19, it is possible to freely set the size of the opening of the winding groove 19 and to readily provide arranged windings. Particularly since a skew is formed on the stator 10, winding can be performed even when the winding nozzle cannot enter from the opening on the inner circumference of the winding groove 19 or when temporarily wound winding 13 cannot be inserted. This method is effective especially when the number of times of winding is small, and this method is suitable for a thick wire and a flat wire.

The stator core 11 is constituted of the teeth 12 wound with the windings 13, the tooth tip protrusions 15 which face the outer circumference of the rotor 20 and are usually disposed on the tips of the teeth 12 with a large width, and a substantially annular yoke 14 for connecting the teeth 12.

FIG. 2 shows that a skew is formed on the stator 10 of FIG. 1. Here, in FIG. 2, parts other than the stator core 11, for example, the windings 13 are omitted.

By forming a skew on the stator 10, it is possible to mainly reduce vibrations caused by irregularities in torque.

However, noise and vibration are also caused by exciting force in the radius direction and a concentrated winding is particularly affected by the forces of attraction between the adjacent teeth 12. Thus, vibrations cannot be reduced only by a skew.

Moreover, the notches 16 are formed on the outer circumference of the stator core 11. The notches 16 are formed on positions corresponding to the teeth 12, that is on the same line as the teeth 12 (on a line in the diameter direction passing through the center of the stator core 12). The notches 16 form the same angle as the teeth 12.

FIG. 3 shows that a skew is formed on the stator 10 and the windings 13, which are wound around the adjacent teeth and are stored in the same winding groove 19, are in contact with each other via the winding vibration damping body 18.

In the case where a skew is formed on the stator 10, according to a skew angle and an amount of the wound windings 13, the adjacent teeth 12 and the windings 13 wound around the teeth 12 come into contact with each other, from a certain skew angle, via the winding vibration damping body 18 in the same winding groove 19. Thus, it is possible to improve the strength of the stator 10 (stator core 11). Further, the windings 13 increase the strength of the stator 10 which suppresses the vibration of the teeth 12. With the damper effect of the windings 13 making contact with each other via the winding vibration damping body 18, it is possible to suppress or damp the vibration of the teeth 12 and the windings 13, thereby reducing the noise and vibration of the motor.

Particularly when the specification of the motor indicates a small amount of windings (low space factor), the above-described operation/working effect can be readily achieved by inserting the winding vibration damping body 18 between the windings 13.

Vibration can be suppressed by using, for the winding vibration damping body 18, a non-magnetic material or a material with a conductivity: σ expressed by the formula below:

$$\sigma < 1 \times 10^{-5} \Omega^{-1} m^{-1}$$

and a material having the above characteristic with a thermal expansion coefficient: α expressed by the formula below:

$$\alpha > 1.1 \times 10^{-5} k^{-1}$$

When the material with the conductivity: σ expressed by $\sigma < 1 \times 10^{-5} \Omega^{-1} m^{-1}$ is used, it is possible to suppress the occurrence of induced current which is caused by changes in magnetic flux appearing between the adjacent teeth 12, thereby reducing the vibration of the teeth 12 while suppressing Joule heating.

When the material with the thermal expansion coefficient expressed by the formula $\alpha > 1.1 \times 10^{-5} k^{-1}$, with a thermal expansion coefficient larger than that of an iron material constituting the stator core 11, the teeth 12 can be held more firmly by heat generated during the operation of the motor, thereby further suppressing the vibration of the teeth 12. This effect is enhanced particularly when the material is used at a high temperature.

By using a resin molded product of PPS, PET, PBT, PA, PTFE, and so on for the non-magnetic winding vibration damping body 18, it is expected that the stiffness of the stator 10 is improved and the effect of damping vibration is obtained. These polyester resins are suitable particularly in a refrigerant of a hermetically enclosed compressor and the like.

Besides, the windings 13 are preferably wound around the teeth 12 via the insulating material 17 (insulating film, an insulator, and the like). Particularly in a refrigerant of a hermetically enclosed compressor and the like, a polyester film is preferable as the insulating material 17. To be specific, an HFC may be used as the refrigerant. A natural refrigerant is also applicable.

When a film is used to insulate the stator core 11 and the windings 13, in order to acquire a space insulation distance between the coil end and the axial end face of the stator core 11, it is preferable to fold both axial ends of the film with a predetermined width and to hang the axial ends on the ends of the stator core 11. Further, the windings 13 having different phases in the same winding groove 19 maybe insulated from each other at the same time by providing, along the winding groove 19, a film which insulates the stator core 11 and the windings 13 and extending the ends of the film.

Further, the stator 11 and the windings 13 maybe insulated by using an insulator which is molded of a resin and is provided along the winding groove 19.

Additionally, the insulating material 17 may be inserted between the winding 13 and an insulating support member 18.

FIG. 4 shows the relationship between a displacement on the outer circumference of the stator core (exciting force during the operation of the motor is set at the inside diameter of the stator) and a skew angle formed on the stator core. FIG. 5 shows the relationship between a torque pulse and a skew angle.

According to FIG. 4, when the stator core 11 is assumed to have, on its annular internal side forming the yoke, protrusions forming the teeth, that is ribs, the ribs are not provided straight in the axial direction but are twisted with a skew angle of 4° or larger in the circumferential direction, so that circular vibration is suppressed.

FIG. 4 shows a displacement on the outer circumference of the stator relative to a given constant load. For example, the line of FIG. 4 moves vertically according to an increase and a reduction in load. At any load, the skew angle is 4° and the displacement remains constant.

Further, according to FIG. 5, it is confirmed that when the number of poles of the rotor 20 is Np=4, a torque pulse increases at a skew angle of 30 (120/Np)° or larger.

Therefore, by setting the skew angle at 4° to (120/Np)°, it is possible to increase the natural frequency of the circular vibration and reduce the displacement of the vibration of the stator core while reducing a torque pulse, achieving lower vibration and noise during an operation.

The windings 13 are formed as self-welding wires and are fixed by applying heat and power to the windings 13 after a skew is formed on the stator 10, so that the windings 13 of the same phase are brought into contact and are fixed with each other more firmly in the winding groove 19. Thus, the vibration of the windings 13 can be suppressed.

The following will describe the formation of a skew that is applicable to the stator of the motor according to the present invention.

Two methods are available for forming a skew on the stator 10.

In one of the methods, a skew is formed after winding (including the insertion of the windings 13 according to the inserter method, this applies in the following explanation). In the other method, winding is performed after a skew is formed on the stator 10.

In the former case, the opening of the winding groove 19 is formed straight along the axial direction and thus winding can be readily performed, achieving high productivity.

In the latter case, winding is performed while the stator core 11 is skewed. Thus, when a skew is formed on the stator 10 after winding, it is possible to fabricate the motor with excellent insulation without damaging the windings 13.

Figure 6:
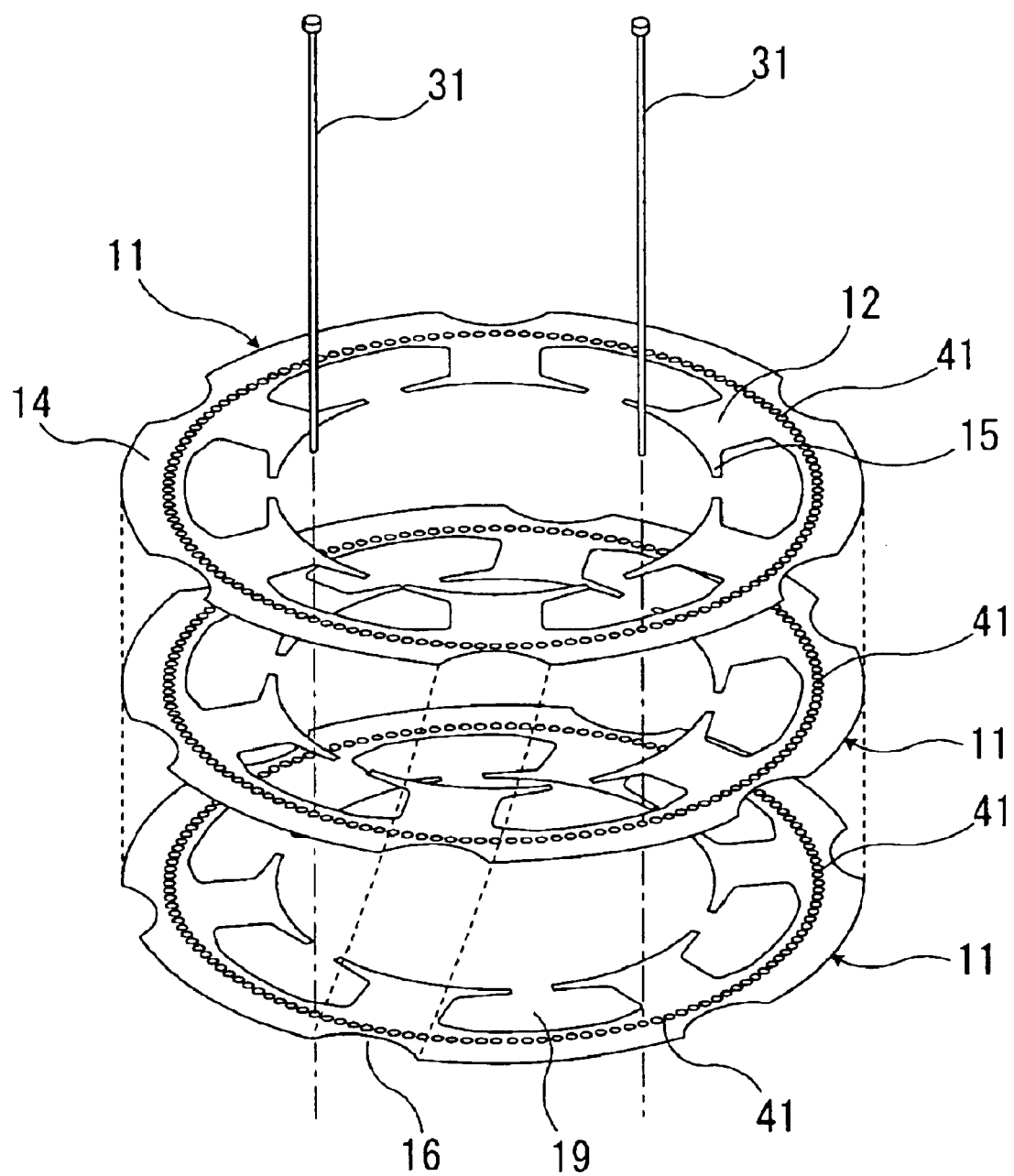
FIG. 6 is a perspective view showing a first method of fabricating a stator constituting he motor of the present invention.

FIG. 6 shows a specific example of forming a skew on the stator 10.

When the skew angle is θs and the number of laminated electromagnetic steel plates 40 is Ns, Ns small holes 41 are provided at least on the same circumference with a pitch of θh relative to the center of rotation, near the outer circumference of the stator core 11 composed of stamped electromagnetic steel plates. θh is expressed by θh=θs÷Ns(°).

A skew is formed on the stator 10 while displacing each of the small holes 41, and pins 31 are passed through the small holes 41 to fix the stator core 11, so that the skew angle of the stator core 11 is readily determined with accuracy and fixation is performed.

For example, in the case of a groove for 4 poles and 6 windings, when a skew of 15° is formed and 80 electromagnetic steel plates 40, each having a thickness of 0.5 mm, are laminated to have a total thickness of 40 mm, it is preferable to provide 80 small holes with a pitch of θh=15÷80=0.1875°. Such small holes are particularly applicable to, for example, a compressor and the like with a large capacity in a packaged air conditioner. Further, when these holes are provided so as to be symmetric by 180°, the skewing process can be performed in a more positive manner. Moreover, after the pins 31 are passed through the small holes 41, the layers may be fixed with each other by welding, bonding, or applying a pressure (swaging) on the outer circumference of the stator 10. In this case, even when the windings 13 have a high tension, it is possible to keep the fixation between the layers of the stator core 11.

In such a fabricating method, when the number of laminated layers is different, the stator core 11 cannot be used with the same stamped shape. This point can be improved by a fabricating method shown in FIG. 7.

Figure 7:
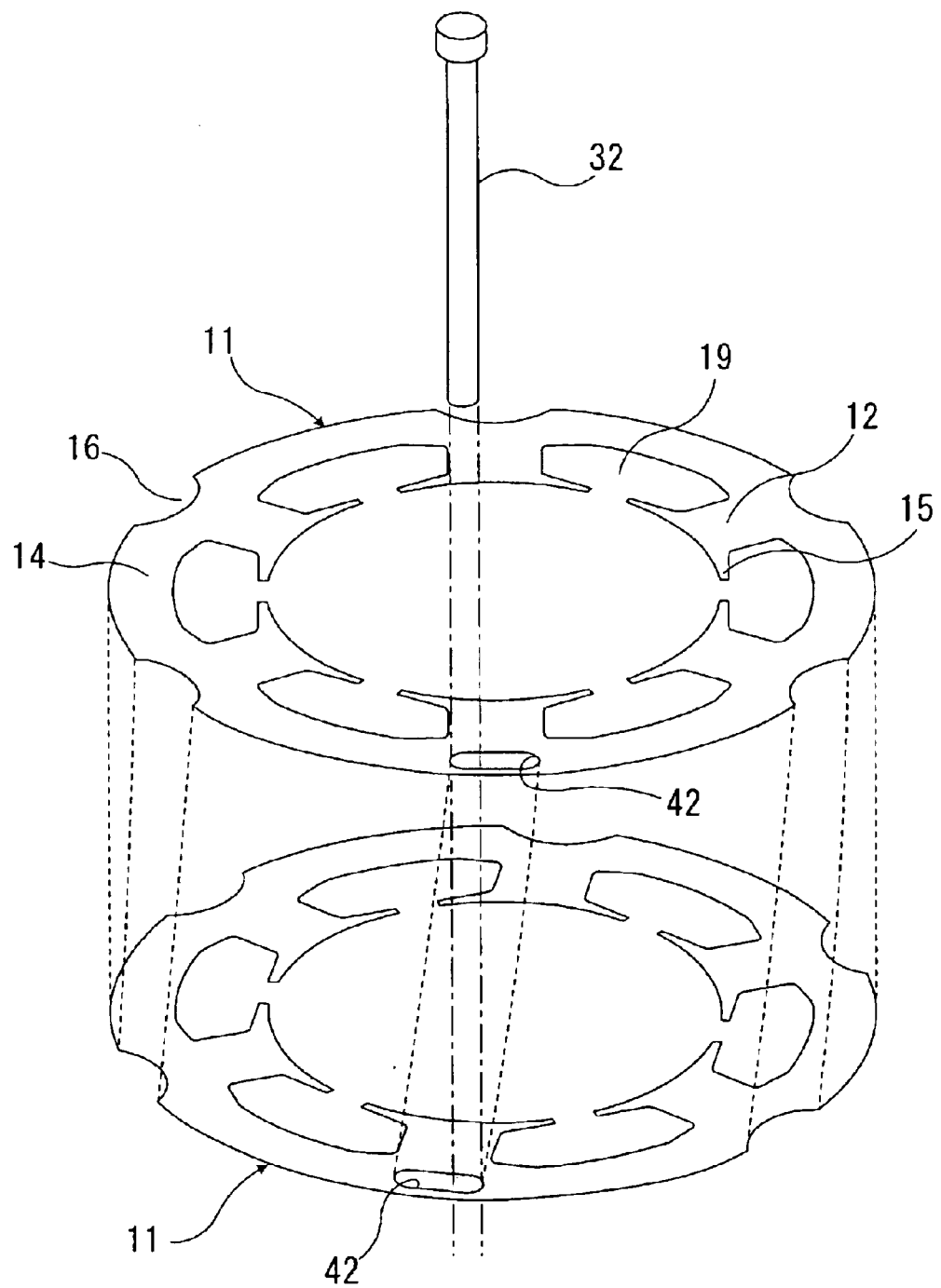
FIG. 7 is a perspective view showing a second method of fabricating the stator constituting the motor of the present invention.

In the fabricating method of FIG. 7, instead of the small holes 41 of FIG. 6, a long hole 42 extending on the same circumference is provided over an angle of θh=θs+α(°) (α is an angle corresponding to the width of a pin) with respect to the center of rotation. In the state in which a pin 32 is inserted through the long hole 42, an laminated upper layer is twisted from a lower layer around the shaft center in the stator core 11 so as to form a skew on the stator 10. Thereafter, the laminated layers are fixed by welding, bonding, or applying a pressure (swaging) on the outer circumference of the laminated stator cores 11, so that the skew angle of the stator core 11 can be precisely determined and fixation is performed.

In this way, even when the lamination is changed, the same stamped shape can be used and the shared use of components is allowed. Besides, in FIG. 7, only one long hole 42 is provided in the circumferential direction of the stator core 11. Two or more long holes 42 may be provided.

Figure 8:
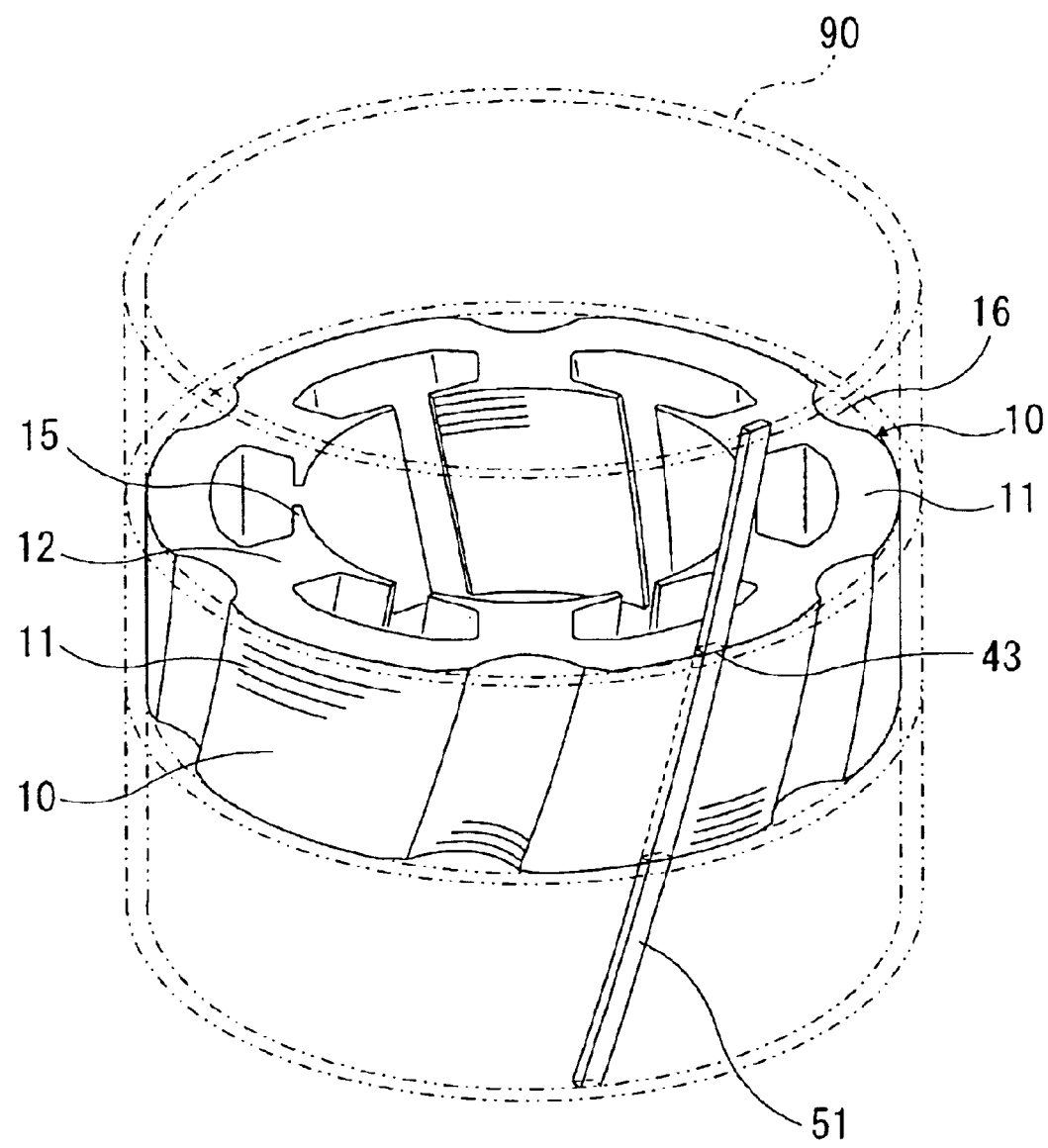
FIG. 8 is a perspective view showing a third method of fabricating the stator constituting the motor of the present invention.

FIG. 8 shows another specific example of forming a skew on the stator 10.

In FIG. 8, elements such as the windings 13 constituting the stator 10 are omitted.

A groove 43 is provided on at least one position of the outer circumference of the stator core 11. Before a skew is formed, the groove 43 is aligned on the same position. The inside of the shell 90 fit into the outside of the stator core 11 comprises a protrusion 51 which is twisted by a predetermined skew angle in the axial rotating direction so as to correspond to the position of the groove 43. When the stator core 11 is stored in the shell 90, a skew is formed on the stator 10.

Such a fabricating method can readily form a skew on the stator 10, increasing productivity. In this case, the stator core 11 may be formed by press fitting or shrink fitting. However, since the stamped electromagnetic steel plates are not firmly fixed to each other, a small interference is desirable. Further, in the case of loose fitting, a unit for fixing the shell 90 and the stator core 11 is necessary.

In the above explanation, the shell 90 fit into the outside of the stator core 11 is the shell of a compressor. Hence, a special jig for forming a skew on the stator 10 is not necessary and the shell 90 can be used as a component as it is, so that used materials can be reduced, the productive facilities can be simplified, and productivity is improved.

The following configuration is also applicable: before the stator 10 is stored in the shell 90, a jig is used which is cylindrical as the shell 90, can be divided into at least two or more in the circumferential direction, and comprises the protrusion 51 twisted by a predetermined skew angle in the axial rotating direction on the inner circumference so as to correspond to the position of the groove 43, the stator 10 is formed with a skew formed by the jig, and the stator 10 is stored in the shell 90.

The above explanation described the case where a skew is formed on the stator 10. Also when a skew is formed on the rotor 20 having permanent magnets embedded as shown in FIG. 1, an advantageous operation/working effect can be obtained as compared with the rotor suppressing the vibration of the motor or having no skew.

Further, since a skew angle is a relative angle formed by the stator 10 and the rotor 20, when a skew is formed on the rotor 20, it is possible to reduce a skew angle formed on the stator 10, thereby readily fabricating the stator 10. A relative angle is 4° to (120/Np)° then, and the tilting direction of a skew on the stator 10 and the tilting direction of a skew on the rotor 20 are formed in opposite directions.

In the above examples, the groove 43 is formed on the stator core 11 and the protrusion 51 engaged in the groove 43 is formed on the shell 90 or the jig. The same configuration is made also by forming a protrusion on the stator core 11 and forming a groove, which is engaged to the protrusion on the stator core 11, on the shell 90 or the jig.

In the above examples, the shell 90 attached with the stator core 11 is the shell 90 of a hermetically enclosed compressor. A shell of a motor used as the actuator for various apparatuses is similarly applicable.

Figure 9:
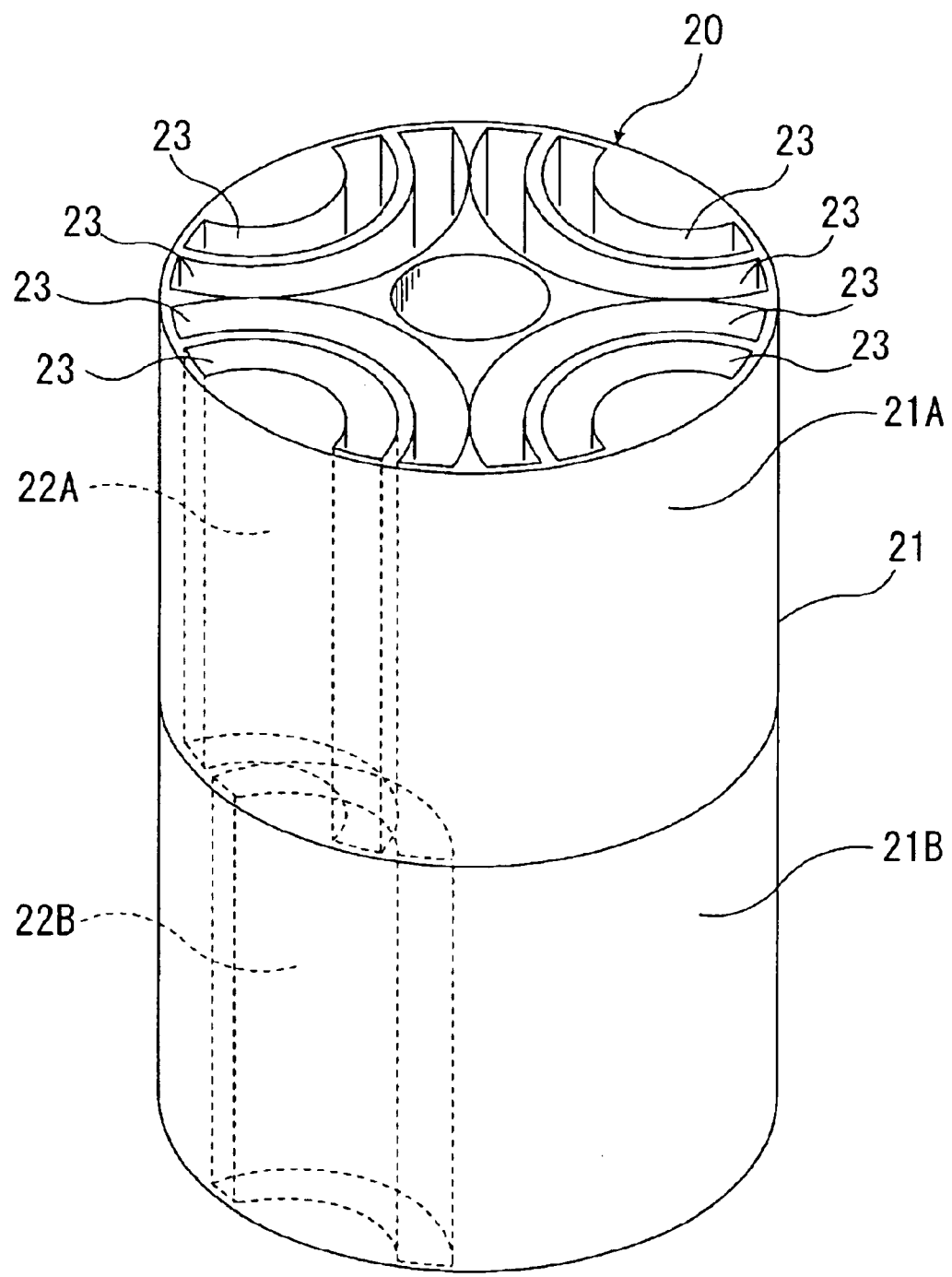
FIG. 9 is a diagram showing a rotor on which a skew is formed according to the present invention.

FIG. 9 shows the rotor 20 having a skew formed thereon.

The rotor 20 having a skew formed thereon is constituted of rotor core units 21A and 21B which are divided into two in the axial direction of the rotor 20. The rotor core units 21A and 21B each comprise magnet embedding holes 23 in the axial direction of the rotor 20.

The rotor core unit 21A and the rotor core unit 21B have permanent magnets 22A and 22B embedded in the magnet embedding holes 23, and are constituted of the rotor core 21 which is displaced by rotation of a given angle in the circumferential direction and is integrally formed.

With this configuration, although the permanent magnets 22A and 22B are vertically divided in the rotor 20, when projection is performed from the end face of the rotor 20, an arrangement is made like a letter X. For example, a magnetic flux flows from one side on the permanent magnet 22A (e.g. north pole) to the other side on the permanent magnet 22B (south pole when the side on the permanent magnet 22A is the north pole), thereby reducing leakage flux.

Further, a skew may be formed continuously on the rotor 20 as the formation of a skew on the stator 10. In this case, when it is assumed that the permanent magnets 22A and 22B are resin magnets permitting injection molding, the fabrication can be readily performed.

In FIG. 9, the rotor core 21 is constituted of the two rotor core units 21 and 21B. The rotor core 21 only has to be divided into at least two in the axial direction of the rotor 20 and be integrally formed while being displaced by rotation of a given angle in the circumferential direction.

In the above examples, a skew is formed on the stator 10 or both of the stator 10 and the rotor 20. A skew may be formed only on the rotor 20.

Besides, these motors can be used for the actuator of a mobile unit (e.g., an automobile, an electric wheelchair, an electric bicycle, or an electric catering wagon) and the refrigeration cycle of an air conditioner installed in the mobile unit, as well as a hermetically enclosed compressor. Also when driving is performed by a battery mounted in the same mobile unit, since the motor is highly efficient, the power consumption of the battery can be reduced. Moreover, since the motor is highly efficient, the motor required to obtain the same output can be reduced in size as compared with the conventional art.

Moreover, when a power supply for operating the motor is a battery, that is when a voltage applied across the terminals of the winding of the motor is 50 volts or lower, for example, 12, 24, or 42 volts, since the motor is highly efficient, the power consumption of the battery can be reduced and the motor can operate for many hours.

As described above, according to the present invention, a skew is formed at least one of the stator and the rotor and the winding vibration damping body is inserted between the windings in the winding groove of the stator, thereby improving the strength of the stator, suppressing or damping the vibration of the teeth and the windings, and achieving low vibration and low noise. Moreover, particularly even when a space factor is low, the windings in the winding groove can be readily supported.

Further, since the rotor has the permanent magnets embedded in the rotor core, it is possible to effectively use magnet torque produced by the permanent magnets and reluctance torque produced by the saliency of the rotor, increasing the efficiency of the motor. Further, since a skew is formed on the rotor, cogging torque and a torque pulse can be reduced and the stator forms a smaller skew angle. Moreover, the rotor skew is formed while the permanent magnets are embedded into the stator core which is integrally formed by rotating the stator core units, which are divided into at least two in the rotor axial direction, by a given angle in the circumferential direction. Thus, it is possible to reduce leakage flux and improve efficiency.

Moreover, regarding the skew angle, when the number of poles is Np, a relative skew angle formed by the stator and the rotor is 4° to (120/Np)°, so that circular vibration is suppressed, a natural frequency is increased, a displacement in the vibration of the stator core is reduced, and vibration and noise can be reduced during an operation. Additionally, when a skew is formed on both of the stator and the rotor, it is possible to reduce a skew angle formed by each of the stator and the rotor, thereby improving productivity.

Besides, since the self-welding wire is used, it is possible to improve the stiffness of the stator including the windings, further suppressing or damping the vibration of the windings.

Additionally, regarding the stator, a skew is formed while the small holes, which are provided with a pitch of $\theta h=\theta s \div Ns(°)$ near the outer circumference of the stamped electromagnetic steel plates, are displaced one by one, and the pin is inserted through the small hole provided near the outer circumference of the electromagnetic plates. Alternatively, one or more long holes extending on the same circumference are provided over an angle $\theta h=\theta s+\alpha(°)$ ($\alpha$ is an angle corresponding to the width of the pin) with respect to the center of rotation, a skew is formed on the stator while the pin is inserted through the long hole, and the laminated electromagnetic plates are fixed by welding, adhesion, or applying a pressure on the outer circumference of the stator core, so that the skew angle of the stator core can be readily formed with accuracy.

Further, the motor of the present invention having the unique effect is used for a hermetically enclosed compressor or a car actuator, and the hermetically enclosed compressor is used for the refrigeration cycle, an air conditioner, or an automobile. Hence, these apparatuses can have low vibration and low noise.

Furthermore, in the motor for the hermetically enclosed compressor used for these apparatuses, the notches acting as passages for a refrigerant are formed on the outer circumference corresponding to the teeth of the stator core. Hence, it is possible to secure a magnetic path required for the passage of a magnetic flux, thereby suppressing a reduction in the efficiency of the motor.

What is claimed is:

1. A motor, comprising:
   a stator having an annular yoke, a plurality of teeth arranged substantially at regular intervals substantially in a radius direction on an inner circumference of the yoke, a winding groove between the adjacent teeth, and a concentrated winding provided on each of the teeth;
   a winding vibration damping body having a single solid cross-section, which body is located in the winding groove so that said adjacent windings are in contact with each other via the winding vibration damping body; and
   a rotor for rotation about an axis of rotation, said rotor opposing an inner circumference of the stator with a small clearance therebetween,
   wherein at least the stator comprises a winding having a skew, and opposing surfaces of said damping body are substantially parallel to planes defined by an outer envelope of each of said adjacent windings and to the skew.

2. The motor according to claim 1, wherein the winding vibration duping body comprises a non-magnetic material or a material having a conductivity σ, where $\sigma < 1 \times 10^{-5} \Omega^{-1} m^{-1}$.

3. The motor according to claim 1, wherein the winding vibration damping body has a thermal expansion coefficient α, where $\alpha > 1.1 \times 10^{-5} k^{-1}$.

4. The motor according to claim 1, wherein the rotor has a permanent magnet embedded in a rotor core.

5. The motor according to claim 4, wherein a rotor skew is formed on the rotor cores integrally formed by rotating rotor core units by a given angle in a circumferential direction, the rotor core units having magnet embedding holes in an axial direction of the rotor and being divided into at least two in the axial direction of the rotor, the permanent magnet being embedded in each of the magnet embedding hole.

6. The motor according to claim 5, wherein the rotor core is divided in the axial direction at regular intervals and the rotor core units are each rotated in the circumferential direction at regular intervals.

7. The motor according to claim 1, wherein when the rotor has Np poles in number, a relative skew angle formed by the stator and the rotor is in a range of 40° to $(120/Np)°$.

8. The motor according to claim 1, wherein the winding comprises a self-welding wire.

9. The motor according to claim 1, wherein the stator is formed by laminating stamped electromagnetic steel plates, and when a skew angle is θs and the number of the laminated electromagnetic plates is Ns, at least Ns small holes are provided, near an outer circumference of the stamped electromagnetic steel plates, on a same circumference with a pitch of $\theta h = \theta s \div Ns(°)$ relative to a center of rotation.

10. A method of fabricating a motor, wherein in fabricating the motor of claim 9, the method comprises:
    laminating the electromagnetic steel plates while displacing each of the small holes formed on the electromagnetic steel, and
    inserting a pin through the small holes of the laminated electromagnetic steel plates to fix the electromagnetic steel plates, so that the stator is fabricated with a skew.

11. The motor according to claim 1, wherein the stator is formed by laminating stamped electromagnetic steel plates, and when a skew angle is θs, a long hole is provided near an outer circumference of the stamped electromagnetic steel plates, the long hole extending over an angle of $\theta h = \theta s + \alpha(°)$ on a same circumference with respect to a center of rotation.

12. A hermetically enclosed compressor, wherein the compressor uses the motor of claim 11, and the cylindrical frame also acts as a shell of the hermetically enclosed compressor.

13. A method of fabricating a motor, wherein in fabricating the motor of claim 11, the method comprises:
    inserting a pin through the long hole of the stamped electromagnetic steel plates to make a laminations;
    twisting an upper layer of the stator around the shaft center with respect to a lower layer of the stator to form a skew on the stator; and
    performing fixation by welding, bonding, or applying a pressure on an outer circumference of the laminated electromagnetic steel plates, so that the stator is fabricated.

14. The motor according to claim 1, wherein a grove or a protrusion is formed on an outer circumference of the stator core and a cylindrical frame is engaged in the stator core so as to form a skew, the cylindrical frame forming a protrusion or groove twisted by a skew angle in an axial rotating direction on an inner circumference so as to correspond to the groove or the protrusion on the outer circumference of the stator core.

15. A method of fabricating a hermetically enclosed compressor, wherein in fabricating the hermetically enclosed compressor using the motor of claim 14, a groove or a protrusion is formed on the outer circumference of the stator core and the stator core is engaged to a shell of the hermetically enclosed compressor of a cylindrical frame, the cylindrical frame forming a protrusion or groove twisted by a skew angle in an axial rotating direction on an inner circumference so as to correspond to the groove or the protrusion on the outer circumference of the stator core, thereby forming a skew.

16. A method of fabricating a hermetically enclosed compressor, wherein in fabricating the hermetically enclosed compressor using the motor of claim 14, the method comprises:
    forming a groove or a protrusion on the outer circumference of the stator core;
    engaging the stator core to a jig that is a cylindrical frame being dividable into at least two in a circumferential direction and formed with a protrusion or groove twisted by a skew angle in an axial rotating direction on an inner circumference so as to correspond to the groove or the protrusion on the outer circumference of the stator core, so that a skew is formed; and detaching the stator having the formed skew from the jig and attaching the stator to an inside of the shell of the hermetically enclosed compressor.

17. A hermetically enclosed compressor, comprising the motor according to claim 1.

18. The hermetically enclosed compressor according to claim 17, wherein the stator of the motor has a notch formed on the outer circumference of the stator core, the notch acting as a passage for a refrigerant, the outer circumference corresponding to the teeth.

19. An air conditioner, wherein the air conditioner uses the hermetically enclosed compressor according to claim 18.

20. An automobile, wherein the automobile is equipped with the air conditioner of claim 19.

21. The hermetically enclosed compressor according to claim 17, wherein an HFC or a natural refrigerant is used as a refrigerant.

22. The hermetically enclosed compressor according to claim 17, wherein terminals of the winding of the motor are fed with a voltage of 50 volts or lower.

23. A refrigeration cycle, wherein the cycle uses the hermetically enclosed compressor according to claim 17.

24. An automobile, wherein the automobile is equipped with the motor according to claim 1 as an actuator, and terminals of the winging of the motor are fed with a voltage of 50 volts or lower.

* * * * *